US009383613B2

(12) United States Patent
Konno

(10) Patent No.: US 9,383,613 B2
(45) Date of Patent: Jul. 5, 2016

(54) LIQUID-CRYSTAL DISPLAY DEVICE

(71) Applicant: NLT Technologies, Ltd., Kawasaki, Kanagawa (JP)

(72) Inventor: Takayuki Konno, Kawasaki (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 14/412,492

(22) PCT Filed: Jul. 4, 2013

(86) PCT No.: PCT/JP2013/068448
§ 371 (c)(1),
(2) Date: Jan. 2, 2015

(87) PCT Pub. No.: WO2014/007355
PCT Pub. Date: Jan. 9, 2014

(65) Prior Publication Data
US 2015/0185564 A1 Jul. 2, 2015

(30) Foreign Application Priority Data

Jul. 4, 2012 (JP) .................................. 2012-150957

(51) Int. Cl.
*G02F 1/1335* (2006.01)
*G02F 1/1343* (2006.01)
(Continued)

(52) U.S. Cl.
CPC ........ *G02F 1/134363* (2013.01); *G02F 1/1368* (2013.01); *G02F 1/13439* (2013.01); *G02F 1/134309* (2013.01); *G02F 1/136286* (2013.01); *G02F 2001/136218* (2013.01)

(58) Field of Classification Search
CPC .................... G02F 1/134363; G02F 1/134309; G02F 1/136286; G02F 1/1368; G02F 1/13439; G02F 2001/136218
USPC ........................................................ 349/141
See application file for complete search history.

(56) References Cited

U.S. PATENT DOCUMENTS 6,525,798 B1 2/2003 Yamakita et al.
2002/0159016 A1 10/2002 Nishida et al.
(Continued)

FOREIGN PATENT DOCUMENTS

JP 2001-337339 A 12/2001
JP 2003-140188 A 5/2003
(Continued)

OTHER PUBLICATIONS

International Search Report for PCT/JP2013/068448 dated Sep. 3, 2013 [PCT/ISA/210].

*Primary Examiner* — Hoan C Nguyen
(74) *Attorney, Agent, or Firm* — Sughrue Mion, PLLC

(57) ABSTRACT

Provided is a lateral-electric-field mode active matrix liquid crystal display device in which an afterimage can be improved. The width of one pixel comb electrode 109B of a plurality of pixel comb electrodes 109 is larger than each of the widths of the other pixel comb electrodes 109 and common comb electrodes 110 and is equivalent to the width of a common shield electrode 110B that covers an image signal wiring line 104 via a second insulating film. A display region is divided into two subregions by the wide pixel comb electrode 109B. In each subregion, the number of pixel comb electrodes 109 is equal to that of common comb electrodes 110. In addition, the width of the common shield electrode 110B is equivalent to that of the wide pixel comb electrode 109B, and the concentration of an electric field in the vicinity of each pixel comb electrode is reduced. Since structural symmetry is achieved, an electric potential distribution becomes symmetrical, and the asymmetry of the manners of emitting light between frames is reduced. As a result, the DC offset component of an image signal after flicker adjustment is reduced to improve an afterimage.

6 Claims, 14 Drawing Sheets

(51) Int. Cl.
*G02F 1/1362* (2006.01)
*G02F 1/1368* (2006.01)

(56) References Cited

U.S. PATENT DOCUMENTS

2003/0128323 A1* 7/2003 Matsumoto ....... G02F 1/136213
                                                                349/141
2004/0150768 A1* 8/2004 Shimizu ............ G02F 1/134363
                                                                349/106
2009/0237578 A1* 9/2009 Naka ................. G02F 1/133555
                                                                349/33

FOREIGN PATENT DOCUMENTS

JP          4047586 B2    2/2008
JP          4603560 B2   12/2010

* cited by examiner

LIQUID-CRYSTAL DISPLAY DEVICE

CROSS REFERENCE TO RELATED APPLICATIONS

This application is a National Stage of International Application No. PCT/JP2013/068448, filed on Jul. 4, 2013, which claims priority from Japanese Patent Application No. 2012-150957, filed on Jul. 4, 2012, the contents of all of which are incorporated herein by reference in their entirety.

TECHNICAL FIELD

The present invention relates to liquid crystal display devices and particularly relates to a lateral-electric-field mode active matrix liquid crystal display device having an excellent afterimage characteristic.

BACKGROUND ART

In an IPS (In-Plane Switching) mode, which has been broadly adopted for large-scale monitors in recent years, the molecular axis of a liquid crystal is rotated by in-plane switching in a plane parallel to a substrate, to produce a display. Thus, visual angle dependency on the rising angle of the molecular axis is precluded, and therefore, the visual angle characteristic of the IPS mode is greatly more advantageous than that of a TN mode. In contrast, since pixel electrodes and common electrodes are placed in a comb form to apply a lateral electric field in the IPS mode, the rate of the area of the electrodes to a display region becomes high. Thus, an opening ratio in the IPS mode has been considered to be more disadvantageous than that in the TN mode but has been improved to be equivalent to that in the TN mode in recent years.

Conventional Example 1

An example of the IPS mode will be described. FIG. 7A illustrates a plan view of one pixel, and FIG. 7B illustrates a cross-sectional view of a display region. A scanning signal wiring line 701 comprising a first metal layer and two common signal wiring lines 702 disposed side by side are formed on a first substrate. A gate insulating film 703 is formed on the scanning signal wiring line 701 and the common signal wiring lines 702, and image signal wiring lines 704 comprising a second metal layer, a thin film semiconductor layer 705, and a source electrode 706 are formed on the first insulating film. A passivation film 707 comprising an inorganic film is formed on the image signal wiring lines 704, the thin film semiconductor layer 705, and the source electrode 706, and a flattening film 708 comprising an organic film is further formed on the passivation film. Pixel comb electrodes 709 and common comb electrodes 710 comprising transparent conductive films are formed on the flattening film 708. When the flattening film 708 is not used, the pixel comb electrodes 709 and the common comb electrodes 710 are formed on the passivation film 707.

The image signal wiring lines 704 are covered completely with common shield electrodes 710B in a wiring line width direction via the passivation film 707 and the flattening film 708. The pixel comb electrodes 709 and the common comb electrodes 710 are connected electrically to the source electrode 706 and the common signal wiring lines 702 through contact holes 711 and 712, respectively. A region in which the common signal wiring line 702 and the source electrode 706 overlap one another has a storage capacitance.

Since both pixel comb electrode 709 and common comb electrode 710 are formed of the transparent conductive films, regions on the electrodes also contribute to transmittance. Due to a structure in which the image signal wiring lines 704 are covered completely with the common shield electrodes 710B in the wiring line width direction, openings can be expanded to the vicinity of the image signal wiring lines 704.

According to an applicant's finding, in Patent Literature 1, a structure in which pixel comb electrodes having different line widths are disposed is disclosed, but it is not defined that the width of a pixel comb electrode having a large line width is generally equal to the width of a common shield electrode. In addition, the position of a pixel comb electrode having a large line width is not defined. An objective of the invention disclosed in Patent Literature 1 is to form a pixel comb electrode having a large line width by layering a transparent conductive layer and a metal layer and to achieve a high opening ratio by forming a storage capacitance at the point of the pixel comb electrode. However, an objective of the present invention is symmetrization of the structures of a pixel electrode and a common electrode and is different from the objective of the invention of Patent Literature 1.

According to another applicant's finding, in Patent Literature 2, a structure in which the width of a central pixel comb electrode is large is disclosed, but the large width of the pixel comb electrode is not generally equal to the width of a common shield electrode. An objective of Patent Literature 2 is not reduction of asymmetry as in the present invention.

In an IPS mentioned in Patent Literature 3, there are three pixel comb electrodes and two common comb electrodes in a display region, and the pixel comb electrodes are more by one. In general, at the time of a negative frame (the potential of the pixel comb electrode is lower than the potential of the common comb electrode), electrons gather in the vicinities of the common comb electrodes, and the vicinities of the pixel comb electrodes thus emit light brightly. Conversely, at the time of a positive frame (the potential of the pixel comb electrode is higher than the potential of the common comb electrode), electrons gather in the vicinities of the pixel comb electrodes, and the vicinities of the common comb electrodes thus emit light brightly. Therefore, the number of the comb electrodes that emit light brightly in the negative frame is different from that in the positive main frame, and the manners of emitting light are asymmetrical between the positive and negative frames.

Further, a structure in which an image signal wiring line is covered completely with the common shield electrodes in a wiring line width direction results in the larger total width of the common comb electrodes and the common shield electrodes than the total width of the pixel comb electrodes, a higher common potential than a pixel potential, higher electric fields in the vicinities of the pixel comb electrodes, and lower electric fields in the vicinities of the common comb electrodes. Therefore, the manner of emitting light in the vicinities of the pixel comb electrodes in the negative frame is different from the manner of emitting light in the vicinities of the common comb electrodes in the positive frame, and the manners of emitting light between the frames become further asymmetrical. When a common potential is swung to perform flicker adjustment in such a state so that luminances between the frames become equivalent, a DC offset is carried on a signal applied between the pixel comb electrodes and the common comb electrodes, and signals become asymmetrical between the frames. Therefore, an afterimage is considered to be deteriorated.

CITATION LIST

Patent Literature

Patent Literature 1: Japanese Patent Laid-Open No. 2003-140188 (p. 5, FIG. 1)
Patent Literature 2: Japanese Patent No. 4047586 (p. 7, FIG. 1 and FIG. 3)
Patent Literature 3: Japanese Patent No. 4603560 (p. 8, FIG. 1)

SUMMARY OF INVENTION

Technical Problem

Based on the above, an objective of the present invention is to solve the problems and to provide a liquid crystal display device in which IPS mode pixel comb electrodes and common comb electrodes are allowed to be structurally symmetrical, whereby the manners of emitting light between frames also become symmetrical, and signals applied between the pixel comb electrodes and the common comb electrodes also become symmetrical after a common potential is swung to perform flicker adjustment so that luminances are equivalent between frames.

Solution to Problem

In order to solve the problems described above, as a liquid crystal display device of a first embodiment of the present invention, there is provided a liquid crystal display device comprising a first substrate, a second substrate facing the first substrate, and a liquid crystal layer held in a state of being sandwiched between the first substrate and the second substrate, wherein the first substrate comprises a thin film transistor comprising a gate electrode, a drain electrode, and a source electrode, a pixel comb electrode comprising a transparent conductive film corresponding to a pixel to be displayed, a common comb electrode and a common shield electrode, to which a reference potential is applied, a scanning signal wiring line, a common signal wiring line placed to be parallel to the scanning signal wiring line, and an image signal wiring line placed to be perpendicular to the common signal wiring line; the thin film transistor is formed near an intersecting point of the scanning signal wiring line and the image signal wiring line; the gate electrode, the drain electrode, the source electrode, and the common comb electrode and the common shield electrode are connected electrically to the scanning signal wiring line, the image signal wiring line, the pixel comb electrode, and the common signal wiring line, respectively; the image signal wiring line is covered with the common shield electrode via an insulating film in a wiring line width direction; and a display is produced by rotating a molecular axis of the liquid crystal layer in a plane parallel to the first substrate by an electric field that is applied between the pixel comb electrode and the common comb electrode and generally parallel to a surface of the first substrate, the liquid crystal display device being a lateral-electric-field mode active matrix liquid crystal display device, wherein the width of at least one pixel comb electrode of the plurality of pixel comb electrodes is larger than the widths of the other pixel comb electrodes and the common comb electrode, and the widths of the pixel comb electrodes, other than the large-width pixel comb electrode, and the common comb electrode are generally equal to each other; and the width of the large-width pixel comb electrode is generally equal to the width of the common shield electrode.

In addition, the common signal wiring line is integrally formed on a lower layer of the large-width pixel comb electrode in parallel with the longitudinal direction thereof.

Further, the source electrode is extensionally formed on a lower layer of the large-width pixel comb electrode in parallel with the longitudinal direction thereof.

Moreover, the large-width pixel comb electrode is formed at a center of a unit pixel or at or a position closest to the center.

Subsequently, the number of the common comb electrodes is equal to that of the pixel comb electrodes in both sides of the large-width pixel comb electrode.

Further, the number of the common comb electrodes is equal to that of the pixel comb electrodes in one side of the large-width pixel comb electrode.

Advantageous Effects of Invention

IPS mode pixel comb electrodes and common comb electrodes are allowed to be structurally symmetrical, whereby the manners of emitting light between frames also become symmetrical, and signals applied between the pixel comb electrodes and the common comb electrodes also become symmetrical after a common potential is swung to perform flicker adjustment so that luminances are equivalent between frames. Therefore, an afterimage is improved.

DESCRIPTION OF EMBODIMENTS

Figure 1A:
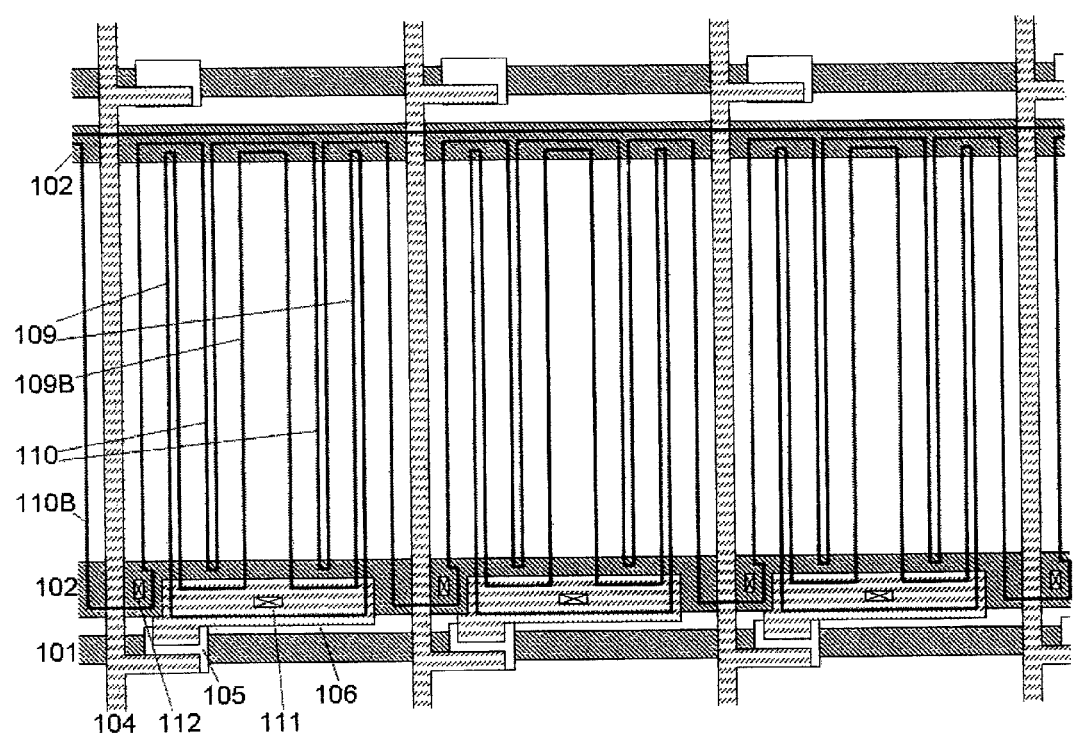
FIG. 1A is a plan view of a liquid crystal display device according to a first example of the present invention.
Figure 1B:
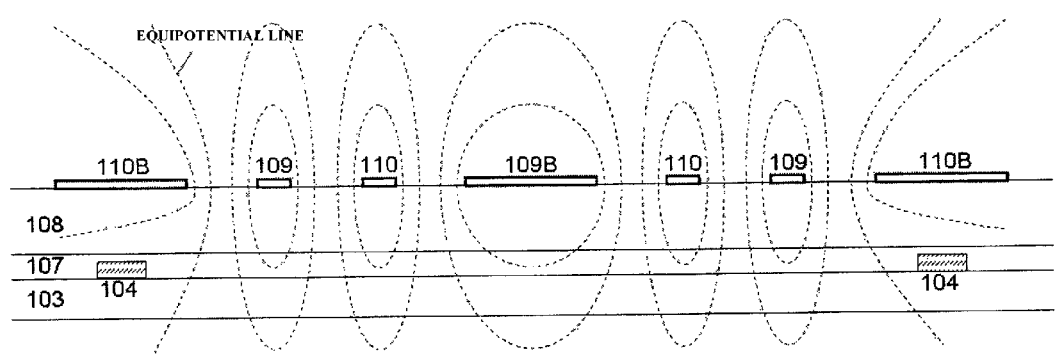
FIG. 1B is a schematic view of the cross section and electric potential distribution of the display region of the liquid crystal display device according to the first example of the present invention.
Figure 7A:
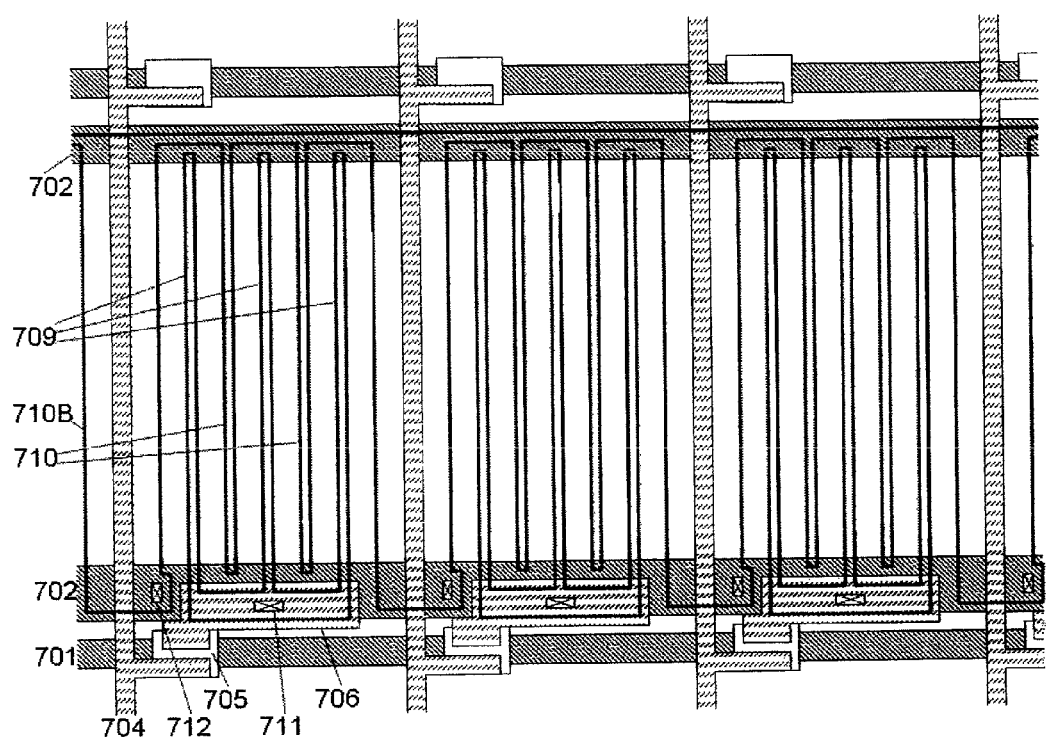
FIG. 7A is a plan view of a liquid crystal display device of Conventional Example 1.
Figure 7B:
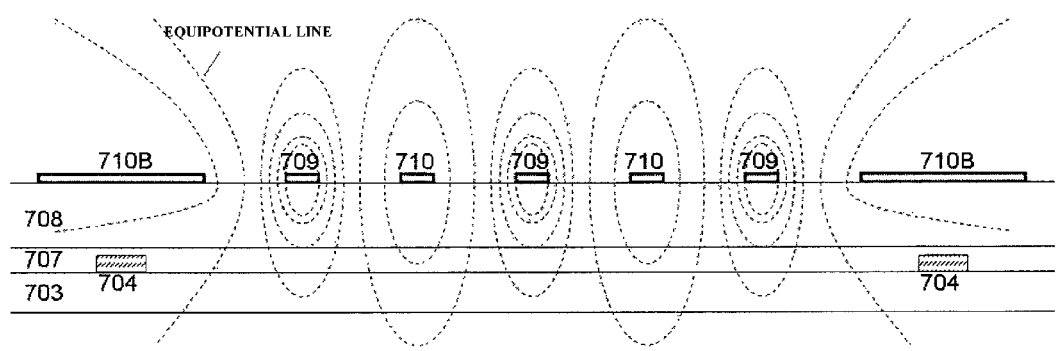
FIG. 7B is a schematic view of the cross section and electric potential distribution of the display region of the liquid crystal display device of Conventional Example 1.

The structure of the present invention is illustrated in FIG. 1A and FIG. 1B. FIG. 1 illustrates an example in which the number of columns is an odd multiple of 2 and the number of pixel comb electrodes is an odd number. The difference from Conventional Example 1 illustrated in FIG. 7 is in that the width of one pixel comb electrode 109B of plural pixel comb electrodes 109 is larger than that of each of the other pixel comb electrodes 109 and common comb electrodes 110 and is equivalent to the width of a common shield electrode 110B that covers an image signal wiring line 104 via a passivation film 107. A display region is divided into two subregions by the wide pixel comb electrode 109B. In each subregion, the number of pixel comb electrodes 109 is equal to that of common comb electrodes 110. Since the width of the common shield electrode 110B is equivalent to that of the wide pixel comb electrode 109B, the concentration of an electric field in the vicinity of a pixel comb electrode as in the conventional example is reduced.

Since structural symmetry is achieved in such a manner, an electric potential distribution becomes symmetrical as in FIG. 1B, and the asymmetry of the manners of emitting light between frames is reduced. As a result, when a common potential is swung to perform flicker adjustment so that luminances between the frames become equivalent, the DC offset components of signals applied between the pixel comb electrodes and the common comb electrodes are reduced, and the signals become approximately symmetrical between the frames. Therefore, an afterimage is improved.

Example 1

Figure 1C:
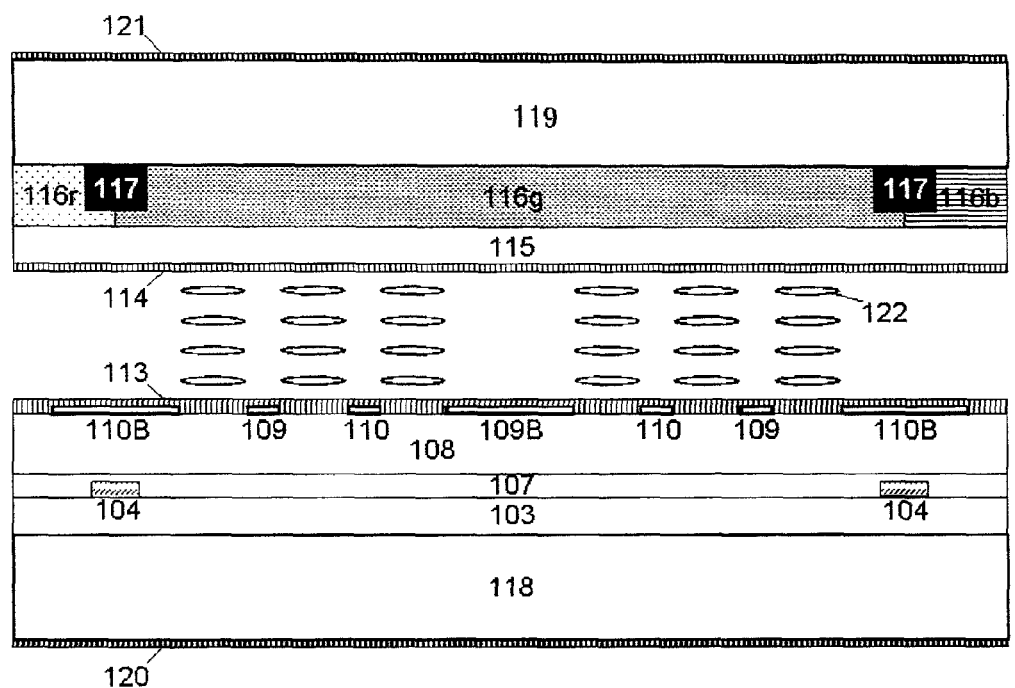
FIG. 1C is a cross-sectional view of the liquid crystal display device according to the first example of the present invention.

A first example of the present invention will be explained with reference to FIGS. 1(a), (b), and (c). FIG. 1A is a plan view of a liquid crystal display device according to the first example of the present invention, and FIG. 1B is a schematic view of the cross section and electric potential distribution of a display region. FIG. 1C is a cross-sectional view, in which a first substrate and a second substrate are allowed to face each other and to sandwich a liquid crystal layer.

More specifically, the lateral-electric-field mode active matrix liquid crystal display device of the present invention comprises: a first glass substrate 118 which is the first substrate; a second glass substrate 119 which is the second substrate facing the first substrate; and a liquid crystal layer 122 held in the state of being sandwiched between the first glass substrate 118 and the second glass substrate 119.

Example 1 formed as above is an example in which the number of columns is an odd multiple of 2 and the number of pixel comb electrodes is an odd number.

Subsequently, a method of forming a pixel in FIG. 1 will be explained below.

In the first substrate, first, a scanning signal wiring line 101 and a common signal wiring line 102, comprising a first metal layer, are formed on the first glass substrate 118 by layering an alloy containing molybdenum as a main component and an alloy containing aluminum as a main component.

Then, a silicon nitride film is formed as a gate insulating film, followed by forming a thin film semiconductor layer 105.

Further, an image signal wiring line 104 and the source electrode 106 of a thin film transistor are formed by a metal layer, as a second metal layer, in which an alloy containing molybdenum as a main component and an alloy containing aluminum as a main component are layered.

An n-type semiconductor layer is formed on the upper layer of the thin film semiconductor layer 105, and an electrode comprising the second metal layer is formed, followed by removing the n-type semiconductor layer at the location other than source/drain electrodes by dry etching.

A passivation film 107 comprising silicon nitride is further formed thereon.

Further, a photosensitive acryl resin is applied as a flattening film 108 thereon to form a predetermined pattern by performing exposure, development, and burning.

Then, a pixel comb electrode 109 and a common comb electrode 110 are formed using a transparent conductive film such as ITO. A common shield electrode 110B is formed to cover the image signal wiring line 104 and shields an electric field from the image signal wiring line 104. As a result, the display region can be widened, and a higher opening ratio becomes possible.

The pixel comb electrode 109 is connected electrically to the source electrode 106 through a contact hole 111 between the source electrode and the pixel comb electrode.

The common comb electrode 110 is connected electrically to the common signal wiring line 102 through a contact hole 112 between the common signal wiring line and the common comb electrode. Such contact holes 112 are not necessary for all pixels, and some or all of the contact holes may be removed.

The width of one central pixel comb electrode 109B of an odd number of such pixel comb electrodes 109 is equivalent to the width of the common shield electrode 110B. The number of the pixel comb electrodes 109 is equal to that of the common comb electrodes 110 in both sides of the wide pixel comb electrode 109B.

In the second substrate, a light-shielding layer 117, color layers 116r, 116g, and 116b, and an overcoat layer 115 are formed, in the order mentioned, on the second glass substrate 119. In the case of a monochrome, the color layers are unnecessary. Oriented layers 113 and 114 are applied and burnt on the first substrate and the second substrate, respectively, rubbing treatment is performed in a predetermined direction, the first substrate and the second substrate are then allowed to overlap one another, and the liquid crystal layer 122 is sandwiched by a spacer material at a predetermined gap. Polarizing plates 120 and 121 are affixed to the outsides of the first substrate and the second substrate, respectively.

A display is produced by rotating the molecular axis of the liquid crystal layer 122 in a plane parallel to the first glass substrate 118 by an electric field that is applied between the pixel comb electrode 109 and the common comb electrode 110 and generally parallel to a surface of the first glass substrate 118.

The display region is divided into two subregions by the wide pixel comb electrode 109B. In each subregion, the number of pixel comb electrodes 109 is equal to that of common comb electrodes 110. In addition, the widths of the common shield electrodes 110B at both ends of the respective subregions are equal to the width of the wide pixel comb electrode 109B, and the concentration of an electric field in the vicinity of each pixel comb electrode as in the conventional example does not occur. Since structural symmetry is achieved in such a manner, an electric potential distribution becomes symmetrical as in FIG. 1B, and the asymmetry of emitting light between frames is eliminated.

The IPS mode pixel comb electrodes and common comb electrodes are allowed to be structurally symmetrical, whereby the manners of emitting light between the frames also become symmetrical, and signals applied between the pixel comb electrodes and the common comb electrodes also become symmetrical after a common potential is swung to perform flicker adjustment so that luminances are equivalent between the frames. Therefore, an afterimage is improved. Ideally, the width of the wide pixel comb electrode 109B is equivalent to that of the common shield electrode 110B. However, it may be considered that the equivalence is difficult depending on the pitch of a pixel. It is desirable to allow the width of the wide pixel comb electrode 109B to approximate the width of the common shield electrode 110B where possible depending on design.

Example 2

Figure 2A:
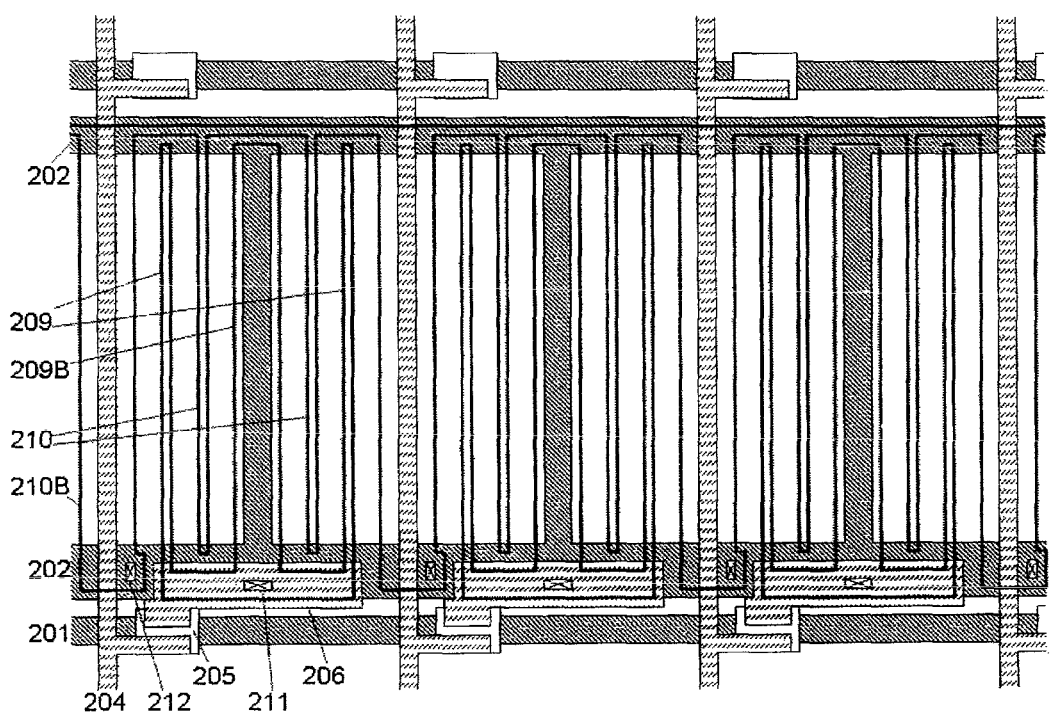
FIG. 2A is a plan view of a liquid crystal display device according to a second example of the present invention.
Figure 2B:
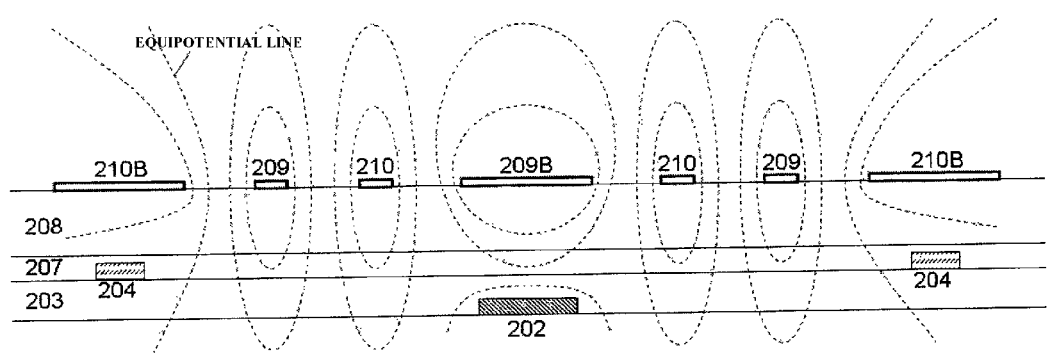
FIG. 2B is a schematic view of the cross section and electric potential distribution of the display region of the liquid crystal display device according to the second example of the present invention.

A second example of the present invention will be explained with reference to FIGS. 2(a) and (b). FIG. 2A is a plan view of a liquid crystal display device according to the second example of the present invention, and FIG. 2B is a schematic view of the cross section and electric potential distribution of a display region. The cross-sectional view is similar to that in the first example.

The difference from the first example is in that a common signal wiring line is formed underneath and in parallel with a pixel comb electrode 209B. The common signal wiring line is formed integrally with two common signal wiring lines 202 parallel to a scanning signal wiring line 201.

The wide pixel comb electrode 209B and each common signal wiring line 202 overlap one another, whereby a storage capacitance can be formed in this region.

The display region is divided into two subregions by the central widest pixel comb electrode 209B. In each subregion, the number of pixel comb electrodes 209 is equal to that of common comb electrodes 210. In addition, the widths of common shield electrodes 210B at both ends of the respective subregions are equal to the width of the wide pixel comb electrode 209B, and the concentration of an electric field in the vicinity of each pixel electrode as in the conventional example does not occur. Since structural symmetry is achieved in such a manner, an electric potential distribution becomes symmetrical as in FIG. 2B, the wide pixel comb electrode 209B is further shielded from light, and therefore the symmetry of the manners of emitting light between frames is preferable to Example 1.

The IPS mode pixel comb electrodes and common comb electrodes are allowed to be structurally symmetrical, whereby the manners of emitting light between the frames also become symmetrical, and signals applied between the pixel comb electrodes and the common comb electrodes also become symmetrical after a common potential is swung to perform flicker adjustment so that luminances are equivalent between the frames. Therefore, an afterimage is improved.

In addition, a storage capacitance can be secured in a region in which the wide pixel comb electrode 209B and each common signal wiring line 202 overlap one another.

In the present invention, the wide pixel comb electrode is disposed in the center, and therefore a lateral opening ratio becomes disadvantageous whereas a longitudinal opening ratio can be increased by securing a storage capacitance in the region in which the wide pixel comb electrode 209B and each common signal wiring line 202 overlap. A generally equivalent opening ratio compared to a conventional IPS mode can be maintained.

Ideally, the width of the wide pixel comb electrode 209B is equivalent to that of the common shield electrode 210B as in Example 1. It is desirable to allow the width of the wide pixel comb electrode 209B to approximate the width of the common shield electrode 210B where possible depending on design.

Example 3

Figure 3A:
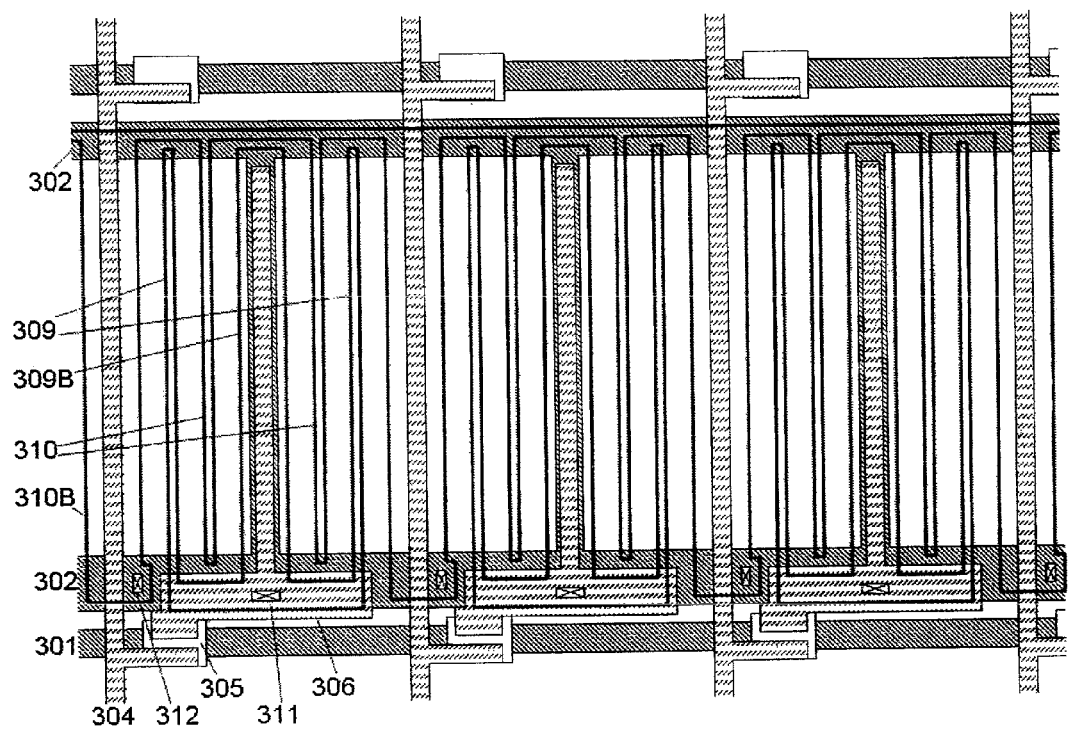
FIG. 3A is a plan view of a liquid crystal display device according to a third example of the present invention.
Figure 3B:
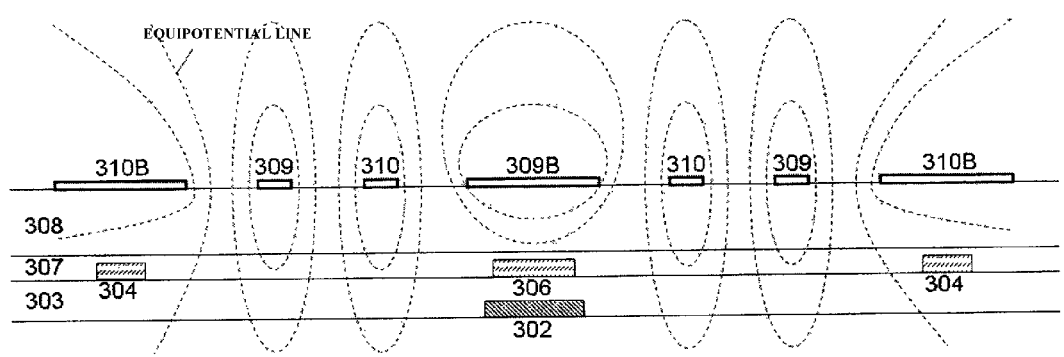
FIG. 3B is a cross-sectional view of the display region of the liquid crystal display device according to the third example of the present invention.

A third example of the present invention will be explained with reference to FIGS. 3(a) and (b). FIG. 3A is a plan view of a liquid crystal display device according to the third example of the present invention, and FIG. 3B is a schematic view of the cross section and electric potential distribution of a display region. The cross-sectional view is similar to that in the first example.

The difference from the second example is in that a common signal wiring line is formed underneath and in parallel with a wide pixel comb electrode 309B, and in addition, a source electrode 306 comprising a second metal layer is further extensionally formed underneath and in parallel with the wide pixel comb electrode 309B.

A common signal wiring line 302 and the source electrode 306 overlap one another underneath the wide pixel comb electrode 309B, whereby a storage capacitance can be formed in this region.

The display region is divided into two subregions by the wide pixel comb electrode 309B. In each subregion, the number of pixel comb electrodes 309 is equal to that of common comb electrodes 310. In addition, the widths of common shield electrodes 310B at both ends of the respective subregions are equal to the width of the wide pixel comb electrode 309B, and the concentration of an electric field in the vicinity of each pixel electrode as in the conventional example does not occur. Since structural symmetry is achieved in such a manner, an electric potential distribution becomes symmetrical as in FIG. 3B, the wide pixel comb electrode 309B is further shielded from light, and therefore the symmetry of the manners of emitting light between frames is preferable to Example 1.

The IPS mode pixel electrodes and common electrodes are allowed to be structurally symmetrical, whereby the manners of emitting light between the frames also become symmetrical, and signals applied between the pixel comb electrodes and the common comb electrodes also become symmetrical after a common potential is swung to perform flicker adjustment so that luminances are equivalent between the frames. Therefore, an afterimage is improved.

In addition, a storage capacitance can be secured in a region in which the wide pixel comb electrode 309B and each common signal wiring line 302 overlap one another.

In the present invention, the wide pixel comb electrode is disposed in the center, and therefore a lateral opening ratio becomes disadvantageous whereas a longitudinal opening ratio can be increased by securing a storage capacitance in the region in which the common signal wiring line 302 and the source electrode 306 overlap one another underneath the wide pixel comb electrode 309B. Since the storage capacitance more than that in Example 2 can be secured, the effect of increasing the longitudinal opening ratio is greater than that in Example 2.

Ideally, the width of the wide pixel comb electrode 309B is equivalent to that of the common shield electrode 310B as in Examples 1 to 2. It is desirable to allow the width of the wide pixel comb electrode 309B to approximate the width of the common shield electrode 310B where possible depending on design.

Example 4

Figure 4:
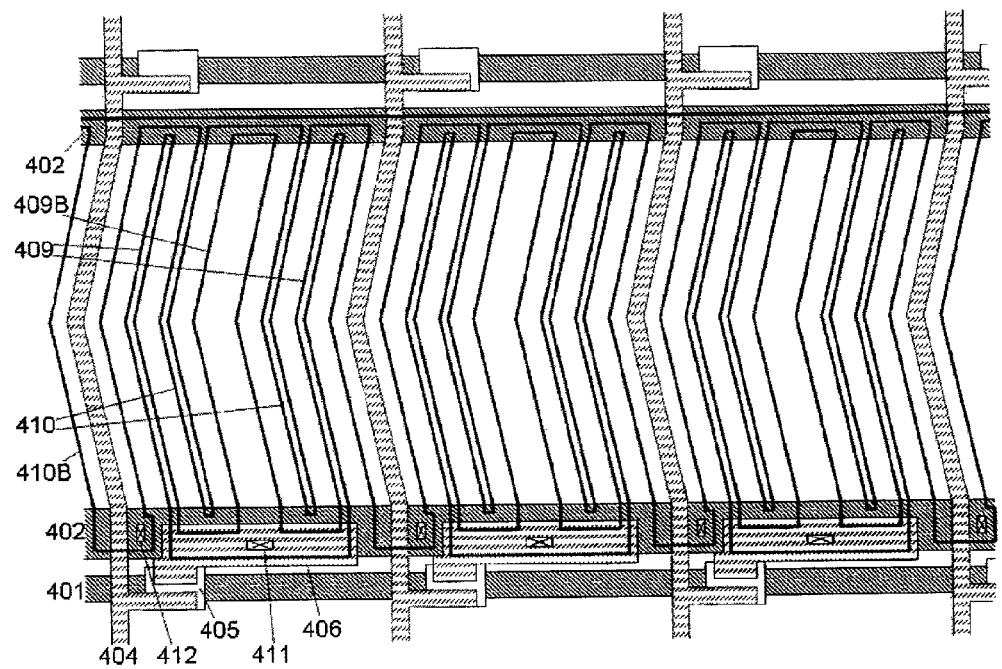
FIG. 4 is a plan view of a liquid crystal display device according to a fourth example of the present invention.

A fourth example of the present invention will be explained with reference to FIG. 4. FIG. 4 is a plan view of a liquid crystal display device according to the fourth example of the present invention. The electric potential distribution and the cross-sectional view are similar to those in the first example.

The difference from the first example is in that pixel comb electrodes 409, a wide pixel comb electrode 409B, common comb electrodes 410, a common shield electrode 410B, and an image signal wiring line 404 are bent and allowed to be multi-domains. Further, a common signal wiring line may be formed underneath and in parallel with the wide pixel comb electrode 409B as in Example 2, or a source electrode 306 comprising a second metal layer may be extensionally formed underneath and in parallel with the wide pixel comb electrode 409B as in Example 3.

The manners of emitting light between frames are equivalent to those in Examples 1 to 3. In addition, the rotation directions of liquid crystal molecules across a bending portion from each other are different due to the multi-domains.

The effect of allowing the manners of emitting light between the frames to be symmetrical to improve an afterimage is equivalent to those of Examples 1 to 3. In addition, due to the multi-domains, a viewing angle characteristic is better than those of Examples 1 to 3.

Ideally, the width of the wide pixel comb electrode 409B is equivalent to that of the common shield electrode 410B as in Examples 1 to 3. It is desirable to allow the width of the wide pixel comb electrode 409B to approximate the width of the common shield electrode 410B where possible depending on design.

Example 5

Figure 5A:
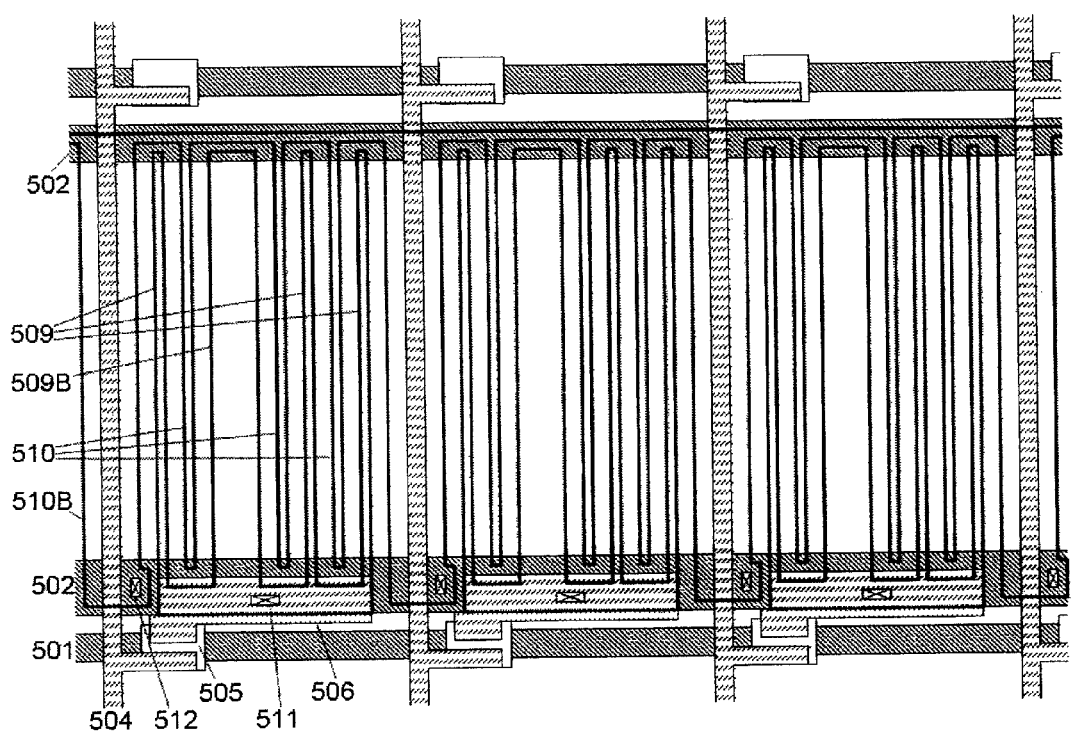
FIG. 5A is a plan view of a liquid crystal display device according to a fifth example of the present invention.
Figure 5B:
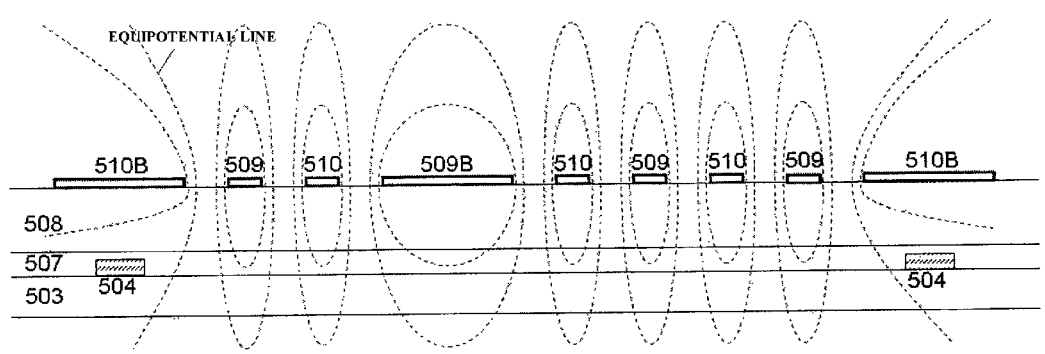
FIG. 5B is a schematic view of the cross section and electric potential distribution of the display region of the liquid crystal display device according to the fifth example of the present invention.

A fifth example of the present invention will be explained with reference to FIGS. 5(a) and (b). FIG. 5A is a plan view of a liquid crystal display device according to the fifth example of the present invention, and FIG. 5B is a schematic view of the cross section and electric potential distribution of a display region. The cross-sectional view is similar to that in the first example. Example 5 is an example in which the number of columns is a multiple of 4, and the number of pixel comb electrodes is an even number.

In this case, since a common comb electrode is in the center of a pixel, the width of one pixel comb electrode 509B closest to the center of pixel comb electrodes 509 of which the number is an even number is allowed to be equivalent to the width of a common shield electrode 510B. Unlike Examples 1 to 4, the wide pixel comb electrode 509B is not located in the center of the pixel and does not bilaterally symmetrically divide the pixel. However, the numbers of common comb electrodes 510 and pixel comb electrodes 509 in both sides of the wide pixel comb electrode 509B are equal, the width of the common shield electrode 510B is equal to the width of the wide pixel comb electrode 509B at both ends of each region, and symmetry is maintained.

The manners of emitting light between frames are allowed to be symmetrical, and the effect of improving an afterimage is equivalent to those in Examples 1 to 4 and does not depend on whether the number of columns is an odd multiple of 2 or a multiple of 4.

Ideally, the width of the wide pixel comb electrode 509B is equivalent to that of the common shield electrode 510B as in Examples 1 to 4. It is desirable to allow the width of the wide pixel comb electrode 509B to approximate the width of the common shield electrode 510B where possible depending on design.

Example 6

Figure 6A:
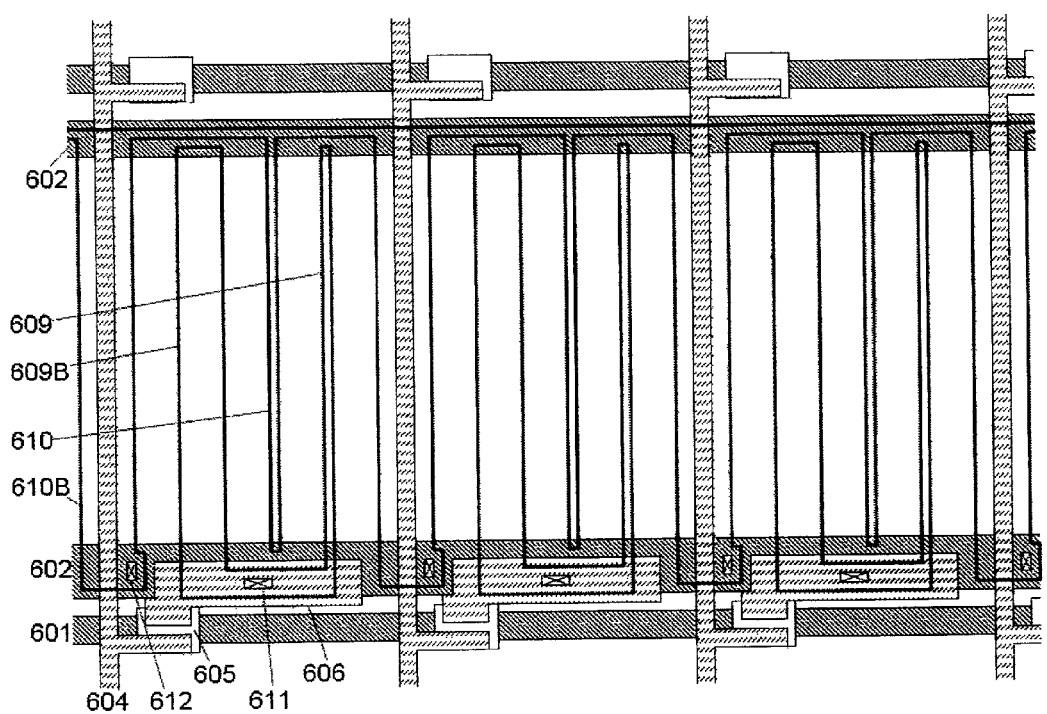
FIG. 6A is a plan view of a liquid crystal display device according to a sixth example of the present invention.
Figure 6B:
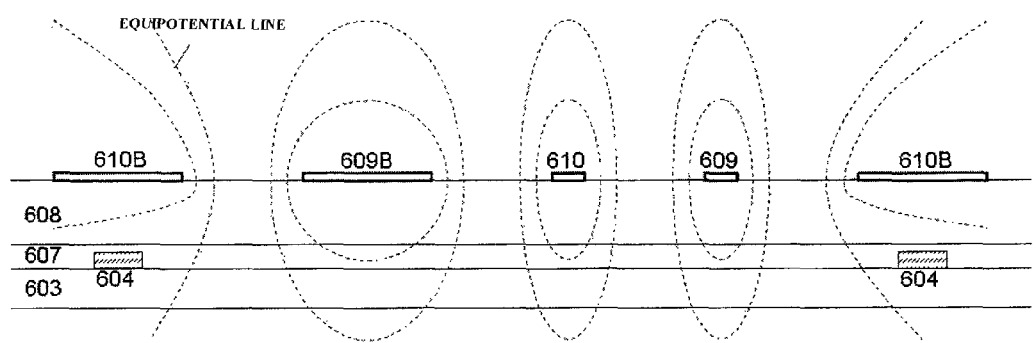
FIG. 6B is a schematic view of the cross section and electric potential distribution of the display region of the liquid crystal display device according to the sixth example of the present invention.

A sixth example of the present invention will be explained with reference to FIGS. 6(a) and (b). FIG. 6A is a plan view of a liquid crystal display device according to the sixth example of the present invention, and FIG. 6B is a schematic view of the cross section and electric potential distribution of a display region. The cross-sectional view is similar to that in the first example. Example 6 is an example in which the number of columns is four as the minimum of a multiple of 4, and the number of pixel comb electrodes is two.

In this case, a common comb electrode is also in the center of a pixel as in Example 5, and the width of one pixel comb electrode 609B of two pixel comb electrodes 609 is allowed to be equivalent to the width of a common shield electrode 610B. Each of the numbers of common comb electrodes 610 and pixel comb electrodes 609 is one in the right of the wide pixel comb electrode 609B, whereas each of the numbers thereof is zero in the left side. Even in such a case, symmetry is maintained in each region.

The manners of emitting light between frames are allowed to be symmetrical, and the effect of improving an afterimage is equivalent to those in Examples 1 to 5 and does not depend on whether the number of columns is an odd multiple of 2 or a multiple of 4.

Ideally, the width of the wide pixel comb electrode 609B is equivalent to that of the common shield electrode 610B as in Examples 1 to 5. It is desirable to allow the width of the wide pixel comb electrode 609B to approximate the width of the common shield electrode 610B where possible depending on design.

INDUSTRIAL APPLICABILITY

The present invention can be utilized in a lateral-electric-field mode active matrix liquid crystal display device and any instrument in which the liquid crystal display device is utilized as a display device.

REFERENCE SIGNS LIST

101, 201, 301, 401, 501, 601, 701 Scanning signal wiring line
102, 202, 302, 402, 502, 602, 702 Common signal wiring line
103, 203, 303, 503, 603, 703 Gate insulating film
104, 204, 304, 404, 504, 604, 704 Image signal wiring line
105, 205, 305, 405, 505, 605, 705 Thin film semiconductor layer
106, 206, 306, 406, 506, 606, 706 Source electrode
107, 207, 307, 507, 607, 707 Passivation film
108, 208, 308, 508, 608, 708 Flattening film
109, 209, 309, 409, 509, 609, 709 Pixel comb electrode
109B, 209B, 309B, 409B, 509B, 609B Wide pixel comb electrode
110, 210, 310, 410, 510, 610, 710 Common comb electrode
110B, 210B, 310B, 410B, 510B, 610B, 710B Common shield electrode
111, 211, 311, 411, 511, 611, 711 Contact hole between source electrode and pixel comb electrode
112, 212, 312, 412, 512, 612, 712 Contact hole between common signal wiring line and common comb electrode
113 Oriented layer of first substrate
114 Oriented layer of second substrate
115 Overcoat layer
116r, 116g, 116b Color layer
117 Light-shielding layer
118 First glass substrate
119 Second glass substrate
120 Polarizing plate closer to first substrate side
121 Polarizing plate closer to second substrate side
122 Liquid crystal layer

The invention claimed is:

1. A liquid crystal display device comprising a first substrate, a second substrate facing the first substrate, and a liquid crystal layer held in a state of being sandwiched between the first substrate and the second substrate, wherein the first substrate comprises a thin film transistor comprising a gate electrode, a drain electrode, and a source electrode, a pixel comb electrode comprising a transparent conductive film corresponding to a pixel to be displayed, a common comb electrode and a common shield electrode, to which a reference potential is applied, a scanning signal wiring line, a common signal wiring line placed to be parallel to the scanning signal wiring line, and an image signal wiring line placed to be perpendicular to the common signal wiring line;

the thin film transistor is formed near an intersecting point of the scanning signal wiring line and the image signal wiring line;

the gate electrode, the drain electrode, the source electrode, and the common comb electrode and the common shield electrode are connected electrically to the scanning signal wiring line, the image signal wiring line, the pixel comb electrode, and the common signal wiring line, respectively;

the image signal wiring line is covered with the common shield electrode via an insulating film in a wiring line width direction; and a display is produced by rotating a molecular axis of the liquid crystal layer in a plane parallel to the first substrate by an electric field that is applied between the pixel comb electrode and the common comb electrode and generally parallel to a surface of the first substrate, the liquid crystal display device being a lateral-electric-field mode active matrix liquid crystal display device, wherein the width of at least one pixel comb electrode of the plurality of pixel comb electrodes is larger than the widths of the other pixel comb electrodes and the common comb electrode, and the widths of the pixel comb electrodes, other than the large-width pixel comb electrode, and the common comb electrode are generally equal to each other; and the width of the large-width pixel comb electrode is generally equal to the width of the common shield electrode.

2. The liquid crystal display device according to claim 1, wherein the common signal wiring line is integrally formed under the large-width pixel comb electrode in parallel with the longitudinal direction thereof.

3. The liquid crystal display device according to claim 2, wherein the source electrode is extensionally formed on a lower layer of the large-width pixel comb electrode in parallel with the longitudinal direction thereof.

4. The liquid crystal display device according to claim 1, wherein the large-width pixel comb electrode is formed at a center of a unit pixel or at a position closest to the center.

5. The liquid crystal display device according to claim 1, wherein the number of the pixel comb electrodes is equal to that of the common comb electrodes in both sides of the large-width pixel comb electrode.

6. The liquid crystal display device according to claim 1, wherein the number of the common comb electrodes is equal to that of the pixel comb electrodes in one side of the large-width pixel comb electrode.

* * * * *